No. 743,742. PATENTED NOV. 10, 1903.
W. MUNN.
FISH CUTTING MACHINE.
APPLICATION FILED NOV. 13, 1902.
NO MODEL.

Witnesses:
F. C. Fliedner
G. H. Nurse

Inventor,
William Munn
By Dewey Strong & Co.
Atty

THE NORRIS PETERS CO., PHOTO-LITHO., WASHINGTON, D. C.

No. 743,742. Patented November 10, 1903.

UNITED STATES PATENT OFFICE.

WILLIAM MUNN, OF SAN FRANCISCO, CALIFORNIA.

FISH-CUTTING MACHINE.

SPECIFICATION forming part of Letters Patent No. 743,742, dated November 10, 1903.

Application filed November 13, 1902. Serial No. 131,128. (No model.)

*To all whom it may concern:*

Be it known that I, WILLIAM MUNN, a citizen of the United States, residing in the city and county of San Francisco, State of California, have invented an Improvement in Fish-Cutting Machines; and I hereby declare the following to be a full, clear, and exact description of the same.

My invention relates to improvements in machines for cutting and slicing fish, particularly salmon, preparatory to canning.

The object of the invention is to provide a simple practicable cutting-machine of the type employing a series of rotary cutters. It is directed particularly toward providing a means for supporting the fish in relation to the cutters, so that the difficulty heretofore experienced in holding the soft fish up to the knives will be obviated.

It consists of the parts and the construction and combination of parts hereinafter more fully described, having reference to the accompanying drawings, in which—

Figure 1:
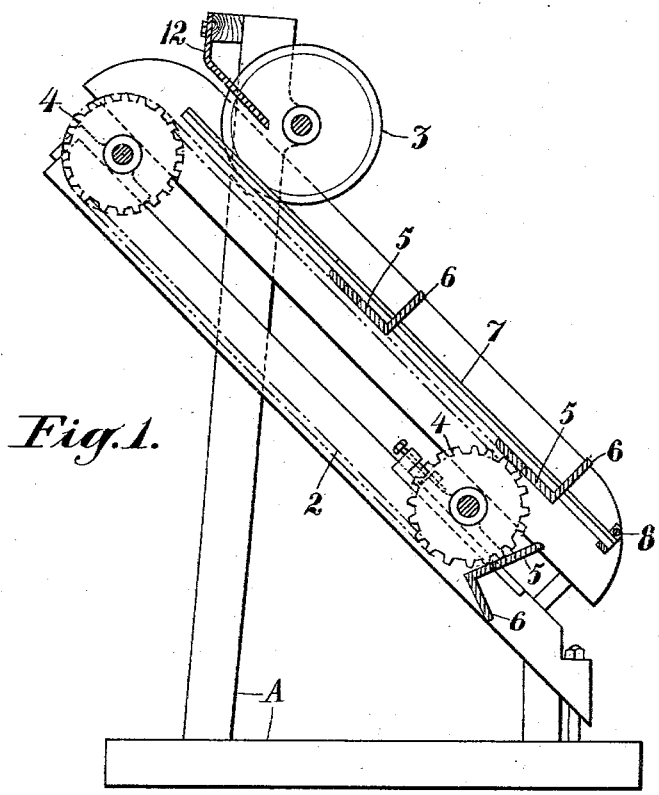
Figure 3:
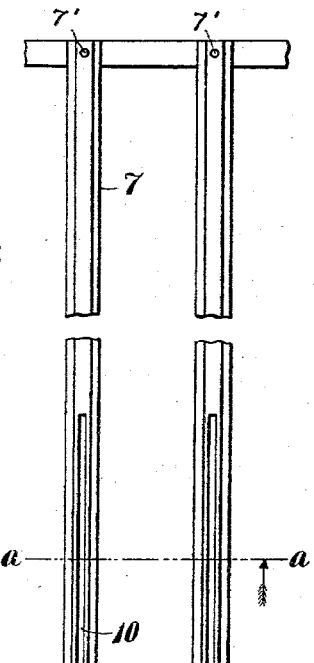
Figure 2:
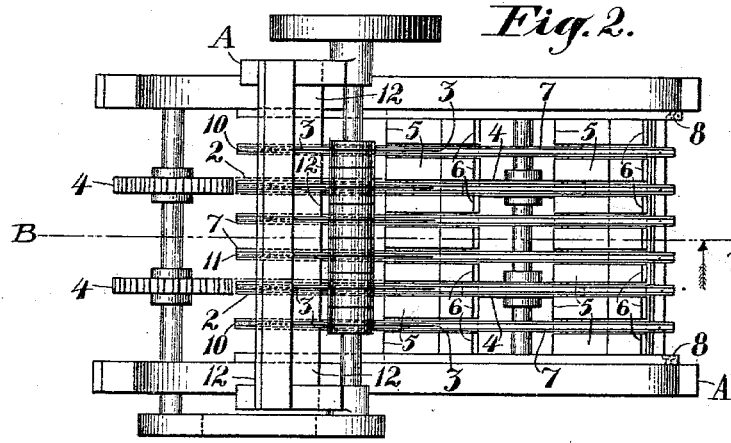
Figure 4:
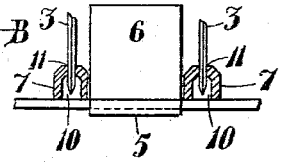

Figure 1 is a longitudinal vertical section of a fish-cutting machine on the line B B of Fig. 2. Fig. 2 is a top plan view of same. Fig. 3 is a plan view of guide-bars. Fig. 4 is a cross-section of same on $a\ a$, Fig. 3.

A represents the frame of the machine, preferably inclined, as shown, and having the endless carrier 2 adapted to receive the fish at the lower end and convey them upward beneath the rotary cutters or knives 3. Any suitable means may be employed to drive the conveyer and the knives.

The conveyer as here shown consists of endless chains passing around sprockets 4, mounted on shafts at either end of the frame, the chains connected transversely at suitable intervals by the boards or plates 5. The latter have the vertical projections 6 on their rear edges, against which the fish are supported in their upward movement. These supports or arms 6 are separated sufficiently to give proper clearance to the cutters between which they are adapted to pass and to accommodate the bars 7, upon which the fish slides in advance of the arms. These bars are pivotally secured at their lower end, as at 7' and the outer bars are pivotally secured to the frame, as at 8. The bars rest loose upon the surface of the carrier, and the intermediate bars have their upper ends provided with slots, through which the cutters operate. These bars form the material part of my invention. Each bar is slotted and channeled, as shown at 10, and its upper surfaces on either side of the slot are beveled to form sharp cutting edges 11, coöperating with the cutter. The bar may be ground down from time to time, according as the edges or the knives become dulled.

Heretofore in machines of this class it has been common to provide grooves or slots in the carrier-bed itself in line with each knife. It was necessary to make these grooves or slots so wide, in order to allow for lateral shift of the carrier and to give clearance to the knives, that the soft fish would yield so on striking the knives that it would be pressed into the grooves, binding the knives and sometimes stopping the machine.

The use of self-adjusting bars, as here shown, permits the slots through which the cutters operate to be made scarcely wider than the cutters, for the bars 7 being secured only at their lower ends are free to move from side to side to accommodate themselves to any untrueness or variation in the movement of the saws, and more particularly they serve to protect the knives from any lateral shifting of the carrier-receptacles.

The slots 10 are open at their ends to allow the knives to clear themselves of refuse.

12 represents strippers which extend beyond the knives parallel with and above the carrier to prevent the cut fish from sticking to and following around with the knives.

In operation the fish are supplied to the carrier as the projections 6 emerge above the bars 7 at the lower end of the machine, and the fish are supported in transit to the cutters upon the bars instead of being supported upon the bed of the carrier, as is usual. The result is that cutters, bars, and carrier coöperate in such manner as to obviate the difficulties heretofore experienced and previously noted in cutting the fish. Passing from under the strippers the carrier discharges the fish now cut into the required lengths into a suitable trough or conveyer, by which it is delivered to other machines employed in the general process of canning.

I do not wish to be understood as being limited to the particular form or design of machine or of endless carrier here shown, for it is obvious that there are many styles of machines employing rotary cutters and carriers of one pattern or another with which my dies could be used.

Having thus described my invention, what I claim, and desire to secure by Letters Patent, is—

1. The combination in a fish-cutting machine, of a conveyer, a vertically-disposed cutter, and a bar superposed on the conveyer and pivotally mounted at one end whereby it adjusts itself laterally relative to the cutter.

2. The combination in a fish-cutting machine, of an inclined support, an inclined conveyer therein, cutters located at the upper end of the support, and bars substantially parallel with the conveyer and superposed thereon, said bars pivotally secured at their lower ends whereby their opposite ends adjust themselves laterally relative to the cutters.

3. The combination in a fish-cutting machine, of an inclined support, vertically-disposed cutters at the upper end thereof, bars extending lengthwise of the support having their lower ends pivotally secured and their upper ends slotted to receive the cutters, said upper ends adjustable laterally relative to the cutters, and a carrier having vertically-disposed projections separated from each other to stand on opposite sides of the bars.

4. The combination in a fish-cutting machine of an endless conveyer having vertically-disposed spaced projections which engage the fish, bars extending through the spaces between said projections, and cutters against which the projections carry the fish said bars pivotally mounted at one end and slotted at the other end to receive the cutters and said last-named ends movable laterally relative to the cutters.

5. In a fish-cutting machine, the combination of a carrier, a cutter and bars superposed upon the carrier and having portions adjacent to the cutter slotted to receive the latter, and having beveled cutting edges coacting with said cutters.

6. The combination in a fish-cutting machine, of vertically-disposed cutting-knives, laterally-swinging bars pivotally secured at one end, in line with said knives and upon which the fish are supported transversely of the knives, said bars having cutting edges coacting with said knives, and means for moving the fish along said bars into engagement with the knives.

7. The combination in a fish-cutting machine, of a series of rotary cutters, bars upon which the fish are supported transversely of said cutters, a carrier operating beneath said bars and cutters, said bars slotted to accommodate the cutters, said bars having the ends opposite the slotted portions pivotally mounted whereby the slotted portions are capable of a transverse adjustable movement relative to the movement of the cutters.

8. In a fish-cutting machine employing rotary cutters, pivotally-mounted laterally-movable bars having beveled cutting edges coacting with the cutters substantially as described.

In witness whereof I have hereunto set my hand.

WILLIAM MUNN.

Witnesses:
HENRY C. DROGER,
JAMES L. KING.